April 15, 1930.   L. N. YOHE   1,754,733
AEROPLANE GLIDER FUSELAGE
Filed April 27, 1929    2 Sheets-Sheet 1
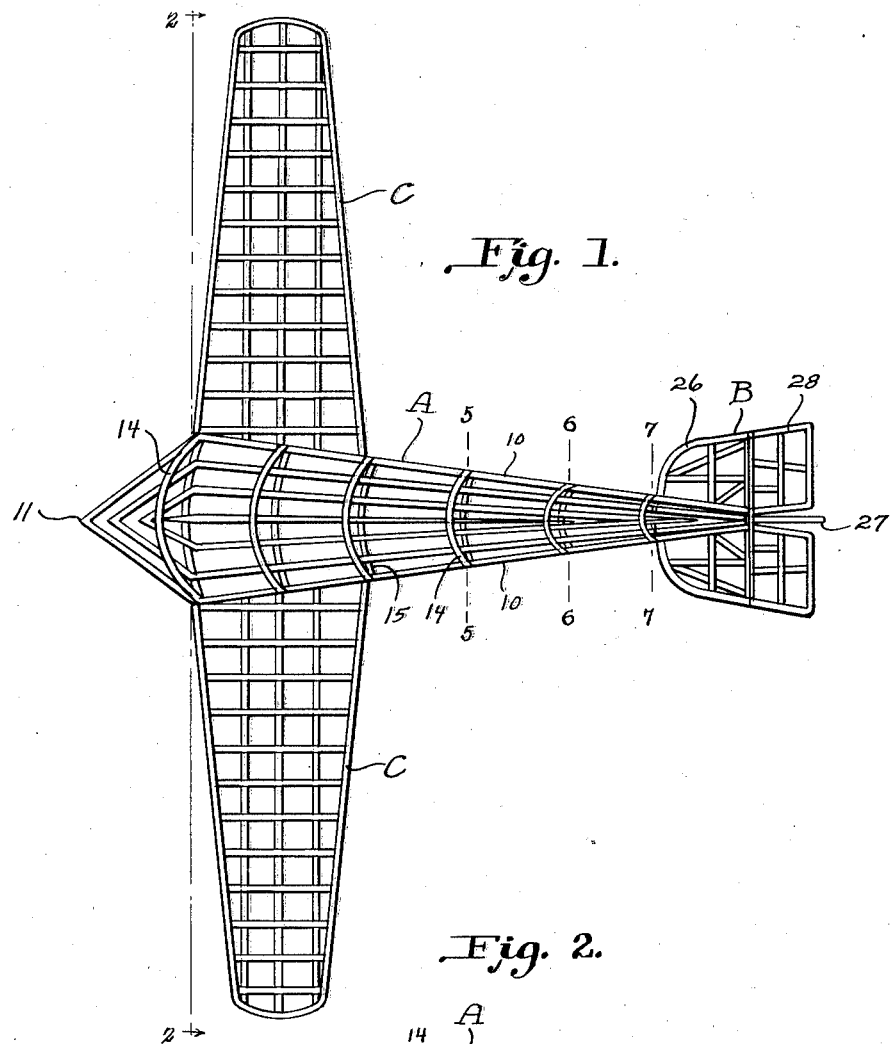
INVENTOR.
Lester N. Yohe
BY
ATTORNEYS.

April 15, 1930.  L. N. YOHE  1,754,733
AEROPLANE GLIDER FUSELAGE
Filed April 27, 1929   2 Sheets-Sheet 2
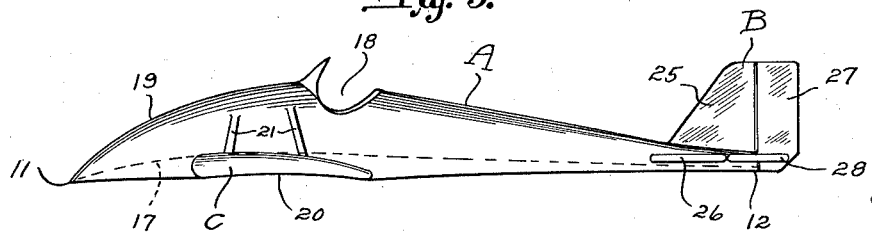
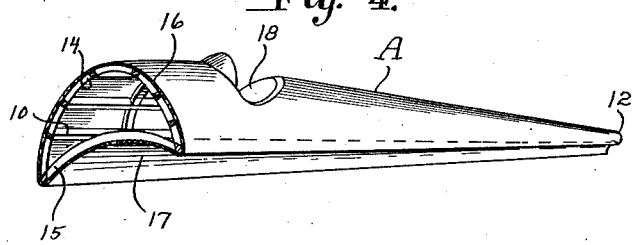
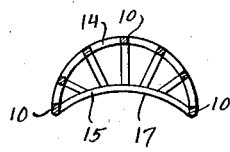 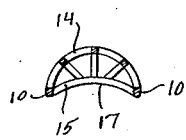 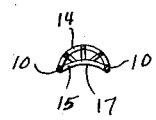
INVENTOR.
Lester N Yohe
ATTORNEYS.

Patented Apr. 15, 1930

1,754,733

UNITED STATES PATENT OFFICE

LESTER N. YOHE, OF NEW OXFORD, PENNSYLVANIA

AEROPLANE GLIDER FUSELAGE

Application filed April 27, 1929. Serial No. 358,684.

The present invention relates to aircraft and the primary object of the invention is to provide an improved construction for aircraft for reducing parasite resistance.

A further object of the invention resides in the provision of a construction for aircraft either of the power driven or glider types wherein the fuselage acts as a sustaining medium during flight of the aircraft.

A further object of the invention resides in the special formation of a fuselage for aircraft wherein the fuselage is designed to act as an airfoil for producing lift, aside from affording space for the propelling means, passengers, or any other desired load A further object of the invention is to increase the lifting power of aircraft by constructing the fuselage with a stream line body of such formation whereby the lower side of the fuselage acts as a sustaining surface for the aircraft in conjunction with the wings.

A still further object of the invention is to provide a fuselage for aircraft, which in longitudinal section substantially conforms to the general cross sectional configuration of an airfoil.

Other objects and advantages of the invention will be apparent during the course of the following detailed description, taken in connection with the accompanying drawings forming a part of this specification and in which drawings:

Figure 1 is a top plan view showing the frame work and general outline of the improved aircraft.

Figure 2 is a section taken substantially on the line 2—2 of Figure 1.

Figure 3 is a side elevation of the aircraft.

Figure 4 is a fragmentary perspective view of the fuselage.

Figures 5, 6 and 7 are sections thru the fuselage taken on the respective lines in Figure 1.

Referring to the drawings in detail, and wherein similar reference characters designate corresponding parts thruout the several views, the letter A designates the fuselage of the aircraft provided at its rear end with the tail assembly B, and C the wings or airfoils with which the fuselage co-acts as a sustaining medium during flight of the aircraft.

Referring first to the special construction of the fuselage A, and particularly to the framing thereof, the same embodies the longérons 10 which diverge from the nose 11 for a short distance of the entire length of the fuselage and then gradually converge to the tail 12. The longérons 10 are connected at spaced points thruout the length of the fuselage by upper and lower arch ribs 14 and 15 respectively extended transversely of the fuselage and which arch ribs provide rigid bracing for the fuselage. As will be observed in Figure 4, the upper arch ribs 14 are preferably, altho not necessarily, of less radius than that of the lower arch ribs 15 so that at any transverse point along the fuselage, the fuselage will be of convexo-concave formation in cross sectionn. The fuselage is preferably of greater width than height at any point thruout its length, and is provided with a suitable covering 16 providing a stream line body having a transversely and preferably a longitudinally concaved bottom surface 17 acting as a sustaining surface for the aircraft. The fuselage may be provided with the usual cockpit 18 altho it is to be distinctly understood that the principal of this invention may also be applied to cabin and other types of aircraft. The bottom surface 17 as will be observed by the dotted lines in Figure 3 is, in the example shown, slightly arched longitudinally of the length of the fuselage forming a longitudinally curved lower camber surface arched transversely thruout the length of the fuselage.

The design of the fuselage is such as to deflect the air from its top surface much in the same manner as do the wings or airfoils of present construction, and for accomplishing this the forward end of the fuselage rises in a gentle curve as at 19 from the nose point 11 preferably to the cockpit 18, in the example shown, or to some point forwardly of the longitudinal center of the craft, and diverges laterally from the nose point 11 to the leading edges of the wings C. During flight of the aircraft the air currents will be deflected upwardly by the portion 19, causing a partial vacuum and thus giving lift to the fuselage. Rearwardly of the portion 19 the fuselage converges on a slight taper to the tail 12 giving a stream line formation to the fuselage so that the fuselage will have low air resistance aside from acting as an airfoil for producing lift.

The wings C may be of any approved construction and type. The wings or airfoils C are connected to project laterally from the widest portion of the fuselage A and in example shown have their lower cambered surfaces 20 disposed even with the lower side edges of the fuselage. The wings may be braced by wing struts 21. The wings are preferably of greatest width at their inner ends and taper toward their outer ends forming a varied chord, diminishing toward the tips of the wings. The wings also preferably have a slight dihedral angle and considerable backward sweep for considerably reducing forward drag which is very essential in the construction of gliders or sail planes.

With the lower cambered surfaces of the airfoils C on a substantially like plane with the under surface of the fuselage A, the lower surfaces of the airfoils and the lower surface of the fuselage will form a substantially T lifting surface.

The tail assembly B may be of any approved construction as one embodying the fin 25, stabilizers 26, rudder 27 and elevators 28.

While no form of landing gear has been illustrated it will be readily apparent that the form of landing gear will depend entirely upon the particular type of aircraft in which the improved fuselage construction is incorporated.

When the fuselage construction is incorporated in a sail plane, the concaved lower surface of the fuselage not only helps lift the craft but also acts as a chute which tends to propel the craft.

The special formation of the fuselage aside from giving additional lift to the aircraft, allows for internal bracing of the fuselage so that parasite resistance is materially reduced. With the present type of fuselages, even tho highly stream lined, the wings or airfoils act to sustain the fuselage and its load, while with a stream lined fuselage as herein described provided with the sustaining bottom surface, the fuselage compensates to quite some extent for itself by its lifting power.

From the foregoing description it will be apparent that an improved construction for aircraft has been disclosed whereby greater lifting power will be obtainable thru formation of the fuselage in such manner as to act as a sustaining medium for the aircraft in conjunction with the airfoils. It will further be apparent that a fuselage construction has been disclosed of such stream line formation as to materially reduce parasite resistance, and which fuselage is of such formation as to substantially conform to the cross sectional configuration of an airfoil and acts upon the air in a like manner as do the airfoils for giving additional lift to the aircraft.

While in the example shown the fuselage is shown as having a cock pit and as of the monoplane type, it is to be understood that this is merely by way of example and that the principle of the invention may be incorporated in the larger cabin type aircraft and that a plurality of companion planes or airfoils may be provided without departing from the spirit of this invention.

Also various changes in detail may be made to the form of invention herein shown and described, without departing from the spirit of the invention or the scope of the following claims.

I claim:

1. In an aircraft, a stream line fuselage having a concaved lower side, and laterally projecting airfoils having their lower surfaces at their inner ends aligning with the side edges of the concaved lower side of the fuselage.

2. In an aircraft, a fuselage of concavo-convex section transversely and longitudinally.

3. In an aircraft, a fuselage of convexo-concave formation in longitudinal section and convexo-concave thruout its length.

4. In an aircraft, a fuselage having a longitudinally curved bottom surface arched transversely thruout the length of the fuselage, and a longitudinally curved upper surface arched transversely thruout the length of the fuselage.

5. A fuselage for aircraft having transversely and longitudinally arched top and bottom surfaces with the arcs of the lower surface being of greater radius than corresponding arcs of the top surface.

6. In an aircraft, a fuselage, and wings extending laterally from the lower side edges of the fuselage adjacent the forward end thereof, said fuselage having a concaved bottom surface and having the forward portion of its upper surface arched upwardly from the nose of the fuselage to a point forwardly of the longitudinal center of the fuselage and the side edges of the portion diverging laterally in a horizontal plane from the nose to the leading edges of said wings, said upper surface having its rear portion sloping downwardly from the said point with its side edges converging from the leading edges of the wings to the tail end of the fuselage.

7. In an aircraft, a fuselage having a concaved bottom surface the marginal edges of which diverge from opposite ends of the fuselage in a plane with the nose point of the fuselage, the upper surface of the fuselage being arched both longitudinally and transversely of the fuselage on a radius less than the radius of the concaved bottom surface.

LESTER N. YOHE.